United States Patent [19]

Lawhorne

[11] Patent Number: 4,944,936

[45] Date of Patent: Jul. 31, 1990

[54] TITANIUM DIOXIDE WITH HIGH PURITY AND UNIFORM PARTICLE SIZE AND METHOD THEREFORE

[75] Inventor: Earl R. Lawhorne, Savannah, Ga.

[73] Assignee: Kemira, Inc., Savannah, Ga.

[21] Appl. No.: 228,810

[22] Filed: Jul. 29, 1988

Related U.S. Application Data

[63] Continuation of Ser. No. 37,204, Apr. 10, 1987, abandoned.

[51] Int. Cl.$^5$ .............................................. C01G 23/047
[52] U.S. Cl. .................................... 423/612; 501/134; 502/350
[58] Field of Search ............... 423/612, 611, 610, 613; 502/350; 501/134

[56] References Cited

U.S. PATENT DOCUMENTS

| | | | |
|---|---|---|---|
| 3,329,484 | 7/1967 | Long | 423/611 |
| 3,528,773 | 9/1970 | Surls | 423/612 |
| 3,796,793 | 3/1974 | Metzer et al. | 423/610 |
| 3,929,501 | 12/1975 | Dunn, Jr. | 423/610 |

*Primary Examiner*—Robert L. Stoll
*Attorney, Agent, or Firm*—Hurt, Richardson, Garner, Todd & Cadenhead

[57] ABSTRACT

High purity titanium dioxide having uniform controlled particle size and method therefor. Titanium tetrachloride is mixed with water to form titanium oxychloride, which in turn is precipitated from aqueous solution to form titanium dioxide.

10 Claims, No Drawings

TITANIUM DIOXIDE WITH HIGH PURITY AND UNIFORM PARTICLE SIZE AND METHOD THEREFORE

This is a continuation of co-pending application Ser. No. 037,204 filed on Apr. 10, 1987, now abandoned.

BACKGROUND OF THE INVENTION

The present invention relates to a dense free flowing titanium having mean particle size of from about 10 to about 40 μm and purity greater than 99.5%, and a method for preparation thereof.

Titanium dioxide can be prepared via the "sulfate" process or by the hydrolysis of titanium tetrachloride. In the latter process, titanium tetrachloride is added to water to form a titanium dioxide hydrolysate. The hydrolysate is then calcined to form the finished titanium dioxide pigment. In U.S. Pat. No. 2,426,788, a titanium tetrachloride solution is added at a controlled rate to a small amount of hot water maintained at or near the boiling point. The titanium tetrachloride is hydrolyzed and precipitates out. The hydrolysate is then calcined. In U.S. Pat. No. 2,337,215, a titanium oxychloride nucleating material is used to initiate the hydrolysis of titanium salt solutions.

A disadvantage to these prior art processes is that the hydrolysates so produced do not result in a uniformly sized titanium dioxide final product. In the case of U.S. Pat. No. 2,426,788, for example, the precipitation rate is rapid, and is essentially completed in a very short time after solution addition stops. While this produces a very small particle size, the size cannot be controlled within narrow limits. Such small particle size products tend to agglomerate and resulting powders are "sticky" rather than free flowing in nature. Dry blending with other powders is usually difficult.

DISCLOSURE OF THE INVENTION

It is accordingly an object of the invention to provide a method for producing titanium dioxide having a uniform particle size.

It is another object of the invention to provide a method, as above, for producing titanium dioxide having high purity.

It is yet another object of the invention to provide a method, as above, for producing titanium dioxide, which facilitates dry blending with additives to give intimate and uniform mixtures suitable for calcination.

It is still another object of the invention to provide the titanium dioxide produced by the above process.

These objects are achieved by a method for producing high purity, uniform particle size titanium dioxide, which comprises the steps of (a) providing a quantity of titanium tetrachloride, (b) adding the titanium tetrachloride to water to form a titanium oxychloride solution, (c) providing a seed suspension of titanium dioxide, (d) adding the seed suspension to the titanium oxychloride solution, (e) boiling the solution for a period sufficient to effect precipitation of titanium dioxide, (f) recovering the precipitated titanium dioxide, and (g) calcining the precipitated titanium dioxide to form a final product.

The objects of the invention are also achieved by a dense, free flowing, uniform particle size titanium dioxide produced by the above process, wherein the titanium dioxide final product has a particle size distribution of from about 10 to about 40 μm and purity greater than 99.5%.

DETAILED DESCRIPTION OF THE PREFERRED EMBODIMENTS

In carrying out the method of the invention, an aqueous solution of titanium oxychloride ($TiOCl_2$) is prepared by adding commercially pure titanium tetrachloride ($TiCl_4$) to water. The final solution contains the equivalent of from about 100 to about 400 grams of $TiO_2$ per liter of solution. In some cases, the commercially pure $TiCl_4$ and the resulting titanium oxychloride solution may contain trace amounts of impurities such as arsenic trichloride (As $Cl_3$) and antimony trichloride (Sb $Cl_3$). Additional purification may optionally be carried out by treatment with gaseous hydrogen sulfide, followed by filtration to remove precipitated solids. Titanium oxychloride solution to be hydrolyzed may contain The most remarkable feature of the titanium dioxide of the invention is the particle size uniformity. The precipitation rate and the final particle size may be controlled by varying the concentration (expressed as $TiO_2$) of the $TiOCl_2$ solution and the amount of nuclei added. Lowering the equivalent $TiO_2$ concentration of the $TiOCl_2$, or increasing the amount of nuclei, will each result in a more rapid precipitation rate and a smaller average particle size in the final product.

The average particle size can vary from about 10 μm to about 30 μm. For an average particle size of about 22 μm, the range is from about 10 μm to about 40 μm. The particle size is generally much larger than, for example, prior art pigmentary $TiO_2$, which can have a particle size of from 0.15 to 0.25 μm and a range of 0.05 to greater than 0.5 μm. Thus, prior art $TiO_2$ has a much less uniform particle size.

Uniformity of particle size contributes to the free-flowing characteristics of the $TiO_2$ of the invention because uniform-sized particles interact less with each other. The apparent density of the $TiO_2$ of the invention can be as high as 2 g/cm$^3$, which is about twice the apparent density of prior art $TiO_2$. The higher apparent density is due to more efficient packing (less void space) possible with highly uniform particles.

The following examples illustrate the invention:

EXAMPLE 1

Titanium oxychloride ($TiOCl_2$) solution was prepared by adding commercially pure titanium tetrachloride ($TiCl_4$) to pure distilled water. The addition was made through glass tubing in such a manner that $TiCl_4$ was introduced under the liquid surface to prevent excessive fuming. Also, a cooling bath was utilized to control temperature rise during the addition. The resulting aqueous $TiOCl_2$ solution was then further purified by treatment with gaseous $H_2S$ followed by filtration through glass fiber filter media to remove precipitated solids.

Hydrolysis seed for nucleating the precipitation was formed by careful neutralization of a portion of the diluted $TiOCl_2$ solution with C.P. $NH_4OH$ solution. pH was adjusted to 3.5 to precipitate the $TiO_2$ in the form of very fine particles. This resulting "seed" slurry was stabilized before use by aging at an elevated temperature for approximately one hour. (This "seed" slurry is best if used within 72–96 hours after preparation.)

Precipitation was carried out in a 12 liter size, 3 Neck Flask which is externally heated by an electric heating mantle controlled by a rheostat. The center neck was fitted with a stirrer which entered the flask through a ground glass bearing. One side neck was fitted with a water cooled reflux condenser. The remaining side neck was used for additions, sampling and temperature measurement.

Six liters (6000 ml) of $TiOCl_2$ solution containing the equivalent of 162.4 grams $TiO_2$ per liter was added to the flask and heated to 60° C. Hydrolysis "seed" equivalent to 0.5% $TiO_2$ on basis of $TiO_2$ in the solution was added and the batch was heated to boil at a rate of 0.5° C./min. up to 75° C.; 0.3° C./min. up to 90° C.; and 0.15° C./min. up to the boil. When the batch temperature reached 90° C., hot water, i.e. 90° C., was added in 500 ml increments, at about 100 ml/min., at 10 minute intervals until a total of 3000 ml was added.

After the batch reached boiling temperature, boiling was continued for two hours. Precipitated $TiO_2$ hydrolysate was separated by filtration, washed with hot distilled water, dried at 110° C. and then calcined at 1000° C. The calcined product was dense and very free flowing. Particle size was determined by a Microtrac small particle analyzer. Crystal structure was rutile.

The resulting product was dense and free flowing, and had the following chemical and physical properties:

| CHEMICAL ANALYSIS | | |
|---|---|---|
| % $TiO_2$ | | >99.5 |
| % $Al_2O_3$ | | 0.018% |
| % $SiO_2$ | | 0.019% |
| Trace Metals | | |
| K | ppm | 44 |
| Fe | ppm | 5 |
| Mg | ppm | 5 |
| Ca | ppm | 4 |
| Ni | ppm | 2 |
| Mg | ppm | 1 |
| Cr | ppm | 1 |
| Na | ppm | 1 |
| Ba | ppm | 1 |
| As + Sb | ppm | <1 |
| Zn | ppm | 0.9 |
| V | ppm | 0.9 |
| Mn | ppm | 0.7 |
| Pb | ppm | 0.45 |
| Cd | ppm | 0.15 |
| Cu | ppm | 0.08 |
| Hg | ppm | 0.005 |

| PHYSICAL PROPERTIES | |
|---|---|
| APPEARANCE: | White free flowing powder |
| TAPPED BULK DENSITY: | 2 g/ml (125 lb./ft.$^3$) |
| PARTICLE SIZE MEAN: | 23 micron |
| RANGE: | 5–30 micron |
| SURFACE AREA: | 2.5 $M^2$/g |
| CRYSTAL STRUCTURE: | Rutile >99.5% (x-ray) |
| LOSS AFTER IGNITION: | <0.1% |

EXAMPLE 2

Titanium oxychloride solution was prepared as in Example 1. Precipitation was carried out in similar equipment except that three neck flasks were five liter capacity. Three precipitation were made as follows:

2a. Total batch was 3.5 liters volume at 200 g/l $TiO_2$ concentration including 0.125% $TiO_2$ as hydrolysis seed, based upon $TiO_2$ in solution. Batch was nucleated at 60° C. and then heated to boiling point at a controlled heating rate of 0.25° C. per minute. Boiling was continued for a period of time to effect greater than 95% precipitation recovery. Precipitated $TiO_2$ was recovered by filtration, washed, and calcined at 950° C.

2b. Same as 2a except that equivalent $TiO_2$ concentration was diluted to 160 g/l.

2c. Same as 2a except that equivalent $TiO_2$ concentration was diluted to 120 g/l.

Results were as follows:

| | Equivalent $TiO_2$ Conc. | $TiO_2$ as Hydrolysis Seed | Boil Time | Precipitation Recovery | Particle Size ($\mu$m) |
|---|---|---|---|---|---|
| 2a | 200 g/l | 0.125% | 7 Hrs. | 96.6 | 25.7 |
| 2b | 160 g/l | 0.125% | 4 Hrs. | 96.6 | 20.4 |
| 2c | 120 g/l | 0.125% | 2 Hrs. | 99.0 | 17.3 |

These data indicate that lowering the equivalent $TiO_2$ concentration increases the precipitation rate and also leads to smaller average particle size.

EXAMPLE 3

Set up using same equipment and same prepared $TiOCl_2$ solution as for Example 2. Each of three precipitations to be made used the same equivalent $TiO_2$ concentration as for Example 2. The same procedure as for Example 2 was followed except that the amount of $TiO_2$ added as hydrolysis seed was varied. Results were as follows:

| | $TiO_2$ as Hydrolysis Seed | Total Boil Time | Final Recovery | Particle Size ($\mu$m) |
|---|---|---|---|---|
| Ex 3a | 0.125% | 6 Hrs. | 96.7% | 24.3 |
| Ex 3b | 0.25% | 6 Hrs. | 98.2% | 19.9 |
| Ex 3c | 0.50% | 6 Hrs. | 98.3% | 17.1 |

These data indicate that increasing the amount of hydrolysis seed leads to slightly higher precipitation recovery and to smaller average particle size.

EXAMPLE 4

$TiOCl_2$ solution was prepared as described earlier by adding pure $TiCl_4$ into distilled water. This resulted in a solution containing 4 molar equivalents of HCl for each molar equivalent of $TiO_2$, although from 2 to 5% of HCl content may be lost by volatilization during handling. One portion of this nominally stoichiometric solution was subjected to prolonged aeration and heating to cause further significant loss of HCl. Precipitations were carried out as in prior examples, except that equivalent $TiO_2$ concentration and HCl to $TiO_2$ ratios were varied.

| | Equiv. $TiO_2$ Conc. | HCl/$TiO_2$ Ratio | $TiO_2$ as Hydrolysis Seed | Boil Time (Hrs) | PPTN Recovery | Particle Size ($\mu$m) |
|---|---|---|---|---|---|---|
| 4a | 215 g/l | 4.0 | 1.0% | 4½ | 92% | 19.6 |
| 4b | 190 g/l | 3.0 | 1.0% | 2 | 98.8% | 13.7 |
| 4c | 190 g/l | 4.0 | 1.0% | 4½ | 97.2 | 17.8 |
| 4d | 215 g/l | 3.0 | 1.0% | 2 | 95.7 | 18.1 |

These data again demonstrate that lowering the equivalent $TiO_2$ concentration will lead to smaller average particle size. They further indicate that reducing the HCl/$TiO_2$ ratio also leads to faster precipitation rates and smaller average particle size precipitates.

EXAMPLE 5

Two liters (2000 ml) of TiOCl$_2$ solution containing the equivalent of 325 grams TiO$_2$ per liter were added to a five liter size flask and heated to 60° C. by direct steam injection. At this point hydrolysis seed equal to 0.5% TiO$_2$, based upon TiO$_2$ in solution, was added. Heating by direct steam injection was continued at rate of 0.5° C. per minute up to the boiling point. The batch was boiled for two hours. Final volume was approximately 5.0 liters because of steam condensation during the heating and boiling cycle. Precipitated TiO$_2$ hydrolysate was recovered by filtration, washed with hot distilled water, and then dried at 110° C. Dried hydrolysate was then calcined at 750° C. The calcined product was dense, free flowing powder with an average particle size of 22.5 μm.

For comparison, another precipitation was made with the same initial charge and nucleation, but using an electric heating mantle to follow the same heating schedule. Steam condensation was simulated by continuous slow addition of water while heating and boiling. TiO$_2$ hydrolysate was filtered, washed, dried and calcined as described. The final product was a dense, free flowing powder with average particle size of 22.0 μm.

These date indicate that particle size is primarily a function of nucleation, concentration and heating rate rather than the method of heating.

EXAMPLE 6

Set up with 3.5 liters TiOCl$_2$ solution containing equivalent of 200 grams TiO$_2$ per liter in a five liter size flask with an electric heating mantle. Batch was preheated to 60° C. before adding 7 grams, i.e. 1% TiO$_2$ on basis of TiO$_2$ in batch, of dry Degussa P-25 titanium dioxide for nucleation. (Degussa P-25 titanium dioxide is manufactured by the exclusive, patented AEROSIL process. Primary particles are 0.015-0.04 μm in size.) Batch was heated at 0.5° C./Min. to boiling point and boiling was maintained for 3 ½ hours. Precipitation recovery was 95.0%. Hydrolysate was recovered by filtration, washed, dried at 110° C., and finally calcined at 750° C. Product was dense, free flowing powder with a mean particle size of 24.5 μm.

A second precipitation was carried out under same conditions as above except that 8% TiO$_2$, as Degussa P-25 TiO$_2$, was added for nucleation. (Adjustments were made to maintain equivalent 200 g/l TiO$_2$ concentration.) After one hour of boiling, precipitation recovery was 96.4%. The product which resulted had a mean particle size of 10.5 μm. It was somewhat less free flowing than the larger mean particle size but would still be considered "free flowing" when compared to pigmentary types of titanium dioxide.

What is claimed is:

1. A method for producing uniform particle size titanium dioxide, comprising the steps of:
   (a) providing a quantity of titanium tetrachloride;
   (b) adding said titanium tetrachloride to water to form a titanium oxychloride solution having a molar ratio of chloride to titanium of from about 4.0 to about 2.5;
   (c) providing a seed suspension of titanium dioxide;
   (d) adding said seed suspension to said titanium oxychloride solution;
   (e) boiling said solution for a period sufficient to effect precipitation of titanium hydrolysate;
   (f) recovering the precipitated titanium hydrolysate at a temperature of less than or equal to about 110° C.;
   (g) calcining said precipitated titanium hydrolysate to form free flowing, anhydrous, rutile titanium dioxide having a mean particle size substantially within the range of from about 10 μm to about 40 μm as the final product; and
   (h) controlling the rate of precipitation of titanium dioxide and the final product particle size by varying the concentration of the titanium oxychloride solution or the amount of seed added by way of said seed suspension.

2. A method as claimed in claim 1, including the step of introducing hydrogen sulfide into the titanium oxychloride solution to remove impurities thereon prior to said addition to water in step (b).

3. A method as claimed in claim 1, wherein the amount of seed suspension added in step (d) is from about 0.1 to about 5.0% by weight based on titanium dioxide concentration in said solution.

4. A method as claimed in claim 1, wherein said boiling step has a duration of from about 1 to about 7 hours.

5. A method as claimed in claim 1 wherein the calcination step is carried out at a temperature of from about 600 to about 1000° C. for a period of from about 0.5 to about 3.0 hours.

6. A method as claimed in claim 1, wherein the concentration of said titanium oxychloride solution is from about 100 to about 400 g of titanium dioxide equivalent per liter of solution.

7. A method as claimed in claim 1, wherein the seed suspension provided in step (c) is prepared separately by neutralizing a portion of the titanium oxychloride solution with ammonium hydroxide and then stabilized by heating to between about 70° C. and about 80° C.

8. A method for producing uniform particle size titanium dioxide, comprising the steps of:
   (a) providing a quantity of titanium tetrachloride;
   (b) adding said titanium tetrachloride to water to form a titanium oxychloride solution containing the equivalent of from about 100 grams to about 400 grams of titanium dioxide per liter of solution, and whose molar ratio of chloride to titanium is from about 4.0 to about 2.5;
   (c) providing a seed suspension of titanium hydrolysate containing the equivalent of from about 0.1 to about 5.0% titanium dioxide by weight in said seed solution;
   (d) adding said seed suspension to said titanium oxychloride solution;
   (e) boiling said solution for a period sufficient to effect precipitation of titanium hydrolysate;
   (f) recovering the precipitated titanium hydrolysate at a temperature of less than or equal to about 110° C.;
   (g) calcining said precipitated titanium hydrolysate to form a free flowing, anhydrous, rutile titanium dioxide having a mean particle size substantially within the range of from about 10 μm to about 40 μm as the final product; and
   (h) controlling the rate of precipitation of titanium dioxide and the final product particle size by varying the concentration of the titanium oxychloride solution or the amount of seed added by way of said seed suspension or both.

9. A method as claimed in claim 1, wherein the final product of free flowing, anhydrous, rutile titanium dioxide has a purity greater than 99.5%.

10. A method as claimed in claim 8, wherein the final product of free flowing, anhydrous, rutile titanium dioxide has a purity greater than 99.5%.

* * * * *